United States Patent [19]
Patel et al.

[11] Patent Number: 5,411,807
[45] Date of Patent: May 2, 1995

[54] HEAT CURABLE PRIMERLESS SILICONE HARDCOAT COMPOSITIONS

[75] Inventors: Gautam A. Patel, Clifton Park; Steven J. Kubisen, Waterford, both of N.Y.

[73] Assignee: General Electric Company, Schenectady, N.Y.

[21] Appl. No.: 239,786

[22] Filed: May 9, 1994

[51] Int. Cl.⁶ .................................................. B32B 9/04
[52] U.S. Cl. ................................... 428/412; 428/447; 524/588; 524/837; 524/858
[58] Field of Search ........................ 524/588, 837, 858; 428/412, 447

[56] References Cited

U.S. PATENT DOCUMENTS

| | | | |
|---|---|---|---|
| 3,655,631 | 4/1972 | Fraser et al. | 528/355 |
| 4,373,060 | 2/1983 | Ching | 524/767 |
| 4,504,635 | 3/1985 | Weber, Jr. et al. | 525/450 |
| 4,624,870 | 11/1986 | Anthony | 427/387 |
| 4,683,287 | 7/1987 | Koleske et al. | 528/357 |
| 4,914,143 | 4/1990 | Patel | 522/148 |
| 5,041,313 | 8/1991 | Patel | 427/379 |
| 5,349,002 | 9/1994 | Patel | 428/412 |

OTHER PUBLICATIONS

Article—Tone Monomers, Tone M-100 and M-201 Monomers Caprolactone Acrylate/Methacrylate Monomers, Union Carbide Chemicals & Plastics Co. Inc.-Aug. 1991-pp. 1-8.

*Primary Examiner*—John C. Bleutge
*Assistant Examiner*—Margaret Glass
*Attorney, Agent, or Firm*—William H. Pittman

[57] ABSTRACT

Heat curable primerless silicone compositions are provided comprising an aqueous/organic solvent silicone dispersion in combination with an adhesion promoter, such as acrylate or methacrylate ester, for example, a caprolactone acrylate or methacrylate adhesion promoter. Composites of a thermoplastic substrate, such as a polycarbonate, and the thermally cured primerless silicone compositions are also provided.

5 Claims, No Drawings

HEAT CURABLE PRIMERLESS SILICONE HARDCOAT COMPOSITIONS

CROSS REFERENCE TO RELATED APPLICATION

Reference is made to application Ser. No. 07/984,612 filed Dec. 2, 1992, now U.S. Pat. No. 5,349,002.

BACKGROUND OF THE INVENTION

The present invention relates to a one part primerless silicone hardcoat composition comprising an aqueous-/organic solvent silicone dispersion consisting essentially of colloidal silica, and a partial condensate of an organoalkoxysilane, in combination with an effective amount of an acrylic ester adhesion promoter, such as a caprolactone acrylate or methacrylate.

Prior to the present invention, as shown by Patel, U.S. Pat. No. 5,041,313, silicone hardcoat composites were made by a two part procedure by initially priming a thermoplastic substrate, such as a polycarbonate substrate, with a solution of a polyacrylic resin in a solvent blend, followed by the application of a silicone hardcoat composition.

It has been reported in European patent application 0439294A1 that priming a thermoplastic substrate prior to the application of the silicone hardcoat is not necessary if a monomeric hydroxy acrylate such as 2-hydroxy ethyl methacrylate is added to the hardcoat mixture before it is thermally cured. However, the use of hydroxy acrylates in coating compositions has sometimes been restricted because of their toxicity, as taught in Chung, U.S. Pat. No. 4,486,504. It would be desirable therefore to be able to formulate one part heat curable silicone hardcoat compositions which can be directly applied in an environmentally safe manner onto a variety of thermoplastic substrates without the requirement of a primer.

SUMMARY OF THE INVENTION

The present invention is based on the discovery that primerless one part heat curable silicone hardcoat compositions can be made by using in the curable silicone composition, an effective amount of an acrylate or methacrylate ester as an adhesion promoter. When applied directly onto a thermoplastic substrate, the resulting curable silicone composition, after cure, provides a silicone hardcoat-thermoplastic substrate composite having excellent adhesion between the thermoplastic substrate and the silicone hardcoat. The treated polycarbonate substrate also exhibits excellent cross hatch adhesion value after an extended period of water immersion at 65° C.

STATEMENT OF THE INVENTION

There is provided by the present invention, a heat curable primerless silicone hardcoat composition comprising by weight, (A) 100 parts of an aqueous/organic solvent silicone dispersion having 10–50% by weight of solids and consisting essentially of 10–70% by weight of colloidal silica and 30–90% by weight of a partial condensate of an organoalkoxysilane, and (B) 1 to 10 parts, of an acrylate or methacrylate ester of the formula,

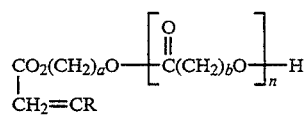

where R is hydrogen or methyl, a is an integer having a value of 2–4, b is an integer having a value of 3–7 and n is $>1$.

Some of the aqueous/organic solvent dispersions of colloidal silica which can be used in the practice of the present invention are shown by Clark, U.S. Pat. No. 3,986,997 which is incorporated herein by reference. These aqueous/organic solvent dispersions can be prepared by adding an organoalkoxysilane, such as methyltrimethoxysilane to a commercially available aqueous dispersion of colloidal silica such as Ludox HS of the E.I.duPont de Nemours and Company and Nalco 1034A of the Nalco Chemical Co. of Naperville, Ill., which has been treated with glacial acetic acid to adjust the pH. After the addition of the methyltrimethoxysilane, the resulting acidified dispersion is allowed to stand for about 1 hour until the pH is stabilized at about 4.5. The resulting compositions can be aged for several days to insure formation of the partial condensate of methyltrimethoxysilane and the silica methanol-water dispersion. Another source of a dispersion of colloidal silica is shown by Ubersax, U.S. Pat. No. 4,177,315 which utilizes a colloidal silica dispersion such as Ludox HS resulting from the hydrolysis of tetraethylorthosilicate by the addition of aliphatic alcohol and an acid. One of the preferred aqueous/organic solvent dispersions of colloidal silica can be made by initially mixing methyltrimethoxysilane and acetic acid, and thereafter adding Ludox, AS-40 colloidal silica along with deionized water. The resulting mixture can then be agitated for 16 hours or more under ambient conditions during which time a suitable alcohol, such as isopropanol or butanol can be added. Preferably, the polyalkoxysilane is methyltrimethoxysilane, methyltrihydroxysilane, or a mixture thereof which can form a partial condensate. Additional polyalkoxysilanes are for example,
tetraethoxysilane,
ethyltriethoxysilane,
diethyldiethoxysilane,
tetramethoxysilane,
methyltrimethoxysilane, and
dimethyldimethoxysilane.

There are included within the acrylic esters of formula 1, compounds such as,

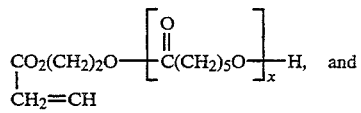

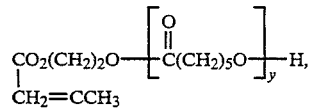

where x has an average value of about 2, and y has an average value of about 2.

The above acrylate/methacrylate esters are commercially available as Tone ® monomers from Union Carbide Coating Resins, Danbury Conn.

In the practice of the present invention, the heat curable primerless silicone hardcoat compositions can be made by combining the caprolactone based polyester polyol, or adhesion promoter, with the aqueous/organic solvent silicone dispersion consisting essentially of organoalkoxysilane, colloidal silica and sufficient alcohol. Additional silicone dispersions which can be used with the adhesion promoter are shown by U.S. Pat. Nos., 3,986,997, 4,624,870, 4,680,232 and 4,914,143 which are incorporated herein by reference.

UV (ultraviolet light) light absorbing agents can be incorporated. These light absorbing agents are described by Ashby et al, U.S. Pat. Nos. 4,278,804, 4,374,674, and 4,419,405, Frye, U.S. Pat. No. 4,299,746 and by Anthony, U.S. Pat. Nos. 4,495,360 and 4,525,426 which are incorporated herein by reference. UV absorbers such as those of hydroxy benzophenone and benzotriazole serves as well as the triazine, cyanoacrylates and benzylidene malonates. Other additives, such as free radical initiators, hindered amine light stabilizers, antioxidants, dye, flow modifiers and leveling agents or surface lubricants can be used. Other colloidal metal oxides can be present at up to about 10% by weight of the aqueous/organic solvent dispersion with colloidal silica and include metal oxides such as, antimony oxide, cerium oxide, aluminum oxide and titanium dioxide. Preferred UV absorbers are the ones which coreact with silanes and are less likely to volatilize during the heat cure. Preferred compounds are 4[gamma-(trimethoxysilyl)propoxy]- 2,hydroxybenzophenone, 4[gamma-(triethoxysilyl)propoxy-2,hydroxybenzophenone or their mixtures. UV absorbers can be used as 2 to 20 wt. % level.

Organic solvents which can be used to make the aqueous/organic solvent silicone dispersion are preferably $C_{(1-4)}$ alkanol, such as methanol, ethanol, propanol, isopropanol, butanol; glycols and glycol ethers, such as propyleneglycolmethyl ether and mixtures thereof.

The silicone hardcoat compositions can be catalyzed with a tetrabutylammonium carboxylate catalyst, such as tetra-n-butylammonium acetate (TBAA) and tetra-n-butylammonium formate to reduce the top coat cure time as shown in U.S. Pat. No. 4,863,520 which is incorporated herein by reference.

Thermoplastic substrates which can be used in the practice of the present invention to make silicone hardcoat-aromatic thermoplastic substrate composites are preferably aromatic polycarbonates, such as Lexan polycarbonate of the General Electric Company. In addition, other aromatic thermoplastic substrates also can be used, such as blends of polyphenylene ether and polystyrene, polyetherimides, polyesters and polysulfones.

The coating composition can be applied onto the aromatic thermoplastic substrate by anyone of the well known methods such as spraying, dipping, roll coating and the like. It can be cured thermally at 130° C. for 30 to 90 minutes, or by the use of infrared or microwave energy.

Composites made in accordance with the present invention can be used in applications, such as windshields, lamp envelopes and safety glasses.

In order that those skilled in the art will be better able to practice the present invention, the following example is given by way of illustration and not by way of limitation. All parts are by weight.

EXAMPLE

An aqueous/organic solvent silicone dispersion was prepared as follows:

There was mixed 203 grams of methyltrimethoxysilane with 1.25 grams of glacial acetic acid. There was added 41.5 grams of deionized water to 125.5 grams of Ludox AS (ammonium-stabilized colloidal silica sol, 40% $SiO_2$ having a silica particle diameter of about 22 millimicrons and a pH of 9.2) to reduce the $SiO_2$ level to 30 weight percent. The diluted silica sol was then added to the acidified methyltrimethoxysilane with stirring. The resulting solution was then stirred for another 16–18 hours at room temperature followed by the addition of 370 grams of a 1:1 (by weight) isopropanol/n-butanol solvent blend and 36 grams of 53% solution of 4-[gamma-(methoxy/ethoxy)silyl/propoxy]-2,hydroxy benzophenone in methanol. The mixture was then stirred for about 2 weeks at room temperature. The composition as formulated had approximately 20% by weight solids, and contained 11% by weight of the UV absorber, based on calculated solids consisting of 33 wt % $SiO_2$ and 67% of the partial condensate of $CH_3Si(OH)_3$ calculated as $CH_3SiO_{3/2}$. The composition had a viscosity of about 5 centistokes at room temperature. The resin was mixed with 0.2% of tetra-n-butyl ammonium acetate (TBAA) catalyst and 0.4% of a silicone based leveling agent.

Several silicone hardcoat compositions were prepared by mixing equal parts of the above silicone composition with various amounts of caprolactone acrylate having a molecular weight of about 344. It is available from the Union Carbide Chemicals and Plastics as Tone ® M-100 monomer.

Polycarbonate panels (4"×6"×⅛") were flow coated with the above silicone hardcoat compositions and air dried under ambient conditions for about 20 minutes and then cured in an air circulated convection oven for 60 minutes at 130° C. Additional polycarbonate panels were treated in a similar manner in accordance with European patent application 0439 294 A1. A silicone hardcoat composition, was used either free of adhesion promoter, or having from 5 to 8 parts of 2-hydroxy ethyl acrylate, per 100 parts of silicone composition.

The resulting silicone hardcoat-polycarbonate composites were then evaluated for scribed or crosshatch adhesion failure, crazing, and microcracking after water immersion from 1 to more than 30 days at 65° C. A cross cut pattern of 100 1 mm squares were scribed onto the treated hardcoat surface. Tape adhesion was checked with a 3M-610 tape according to ASTM D3359-83. The coated samples were immersed in a hot water bath at 65° C. and checked periodically. Complete or partial removal of coating along the scribed edges or any 1 mm size square is considered a failure. The following results were obtained where "PhR" means parts per 100 parts of resin solids:

TABLE 1

Water Immersion Test at 65° C.
Cross-Hatch Adhesion Evaluation

| Adhesion Promoter | Amount, PhR | Cross-Hatch Adhesion Failure Time, No. of Days |
|---|---|---|
| None, Control | — | 2 |
| 2-Hydroxy ethyl acrylate | 5 | 2 |
| 2-Hydroxy ethyl methacrylate | 8 | 1 |

TABLE 1-continued

Water Immersion Test at 65° C.
Cross-Hatch Adhesion Evaluation

| Adhesion Promoter | Amount, PhR | Cross-Hatch Adhesion Failure Time, No. of Days |
|---|---|---|
| Caprolactone Acrylate | 2.5 | >10, No failure |
| Caprolactone Acrylate | 5.0 | >10, No failure |

TABLE 2

QUV* Accelerated Weathering Performance
Caprolactone Acrylate Adhesion Promoter

| Amount of Adhesion Promoter (PhR) | Adhesion Failure Time, Hours |
|---|---|
| 1.25 | 1700 |
| 2.5 | 2500 |
| 5.0 | 2900 |
| None, control | 200 |

*Q-Panel Company. Weathering cycle-8 hours UV-B exposure (FS-40 lamps) at 70° C. followed by 4 hours of moisture condensation in dark at 50° C.

The above results show that the compositions of the present invention provide a significant improvement in the permanence or durability of the adhesion.

Although the above example is directed to only a few of the very many variables which can be used in making the heat curable primerless silicone hardcoat compositions of the present invention, it should be understood that the present invention involves the use of a much broader variety of aqueous/organic solvent silicone dispersions, and caprolactone acrylates or methacrylates as set forth in the description preceding this example.

What is claimed is:

1. A heat curable primerless silicone hardcoat composition comprising by weight,
   (A) an aqueous/organic solvent silicone dispersion having 10-50% by weight of solids and consisting essentially of 10-70% by weight of colloidal silica and 30-90% by weight of a partial condensate of an organoalkoxysilane, and
   (B) 1 to 10 parts, per 100 parts (A), of an acrylate or methacrylate ester of the formula,

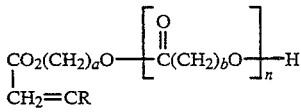

where R is hydrogen or methyl, a is an integer having a value of 2-4, b is an integer having a value of 3-7 and n is $\geq 1$.

2. A heat curable primerless silicone hardcoat composition in accordance with claim 1, where the acrylate or methacrylate ester is a caprolactone acrylate.

3. A heat curable primerless silicone hardcoat composition in accordance with claim 1, where the acrylate or methacrylate ester is a caprolactone methacrylate.

4. A composite formed by thermally curing the primerless silicone hardcoat composition of claim 1 in contact with a thermoplastic substrate.

5. A polycarbonate composite in accordance with claim 4.

* * * * *